Dec. 8, 1942.  G. K. AUE ET AL  2,304,492
FILTER
Filed Oct. 9, 1940
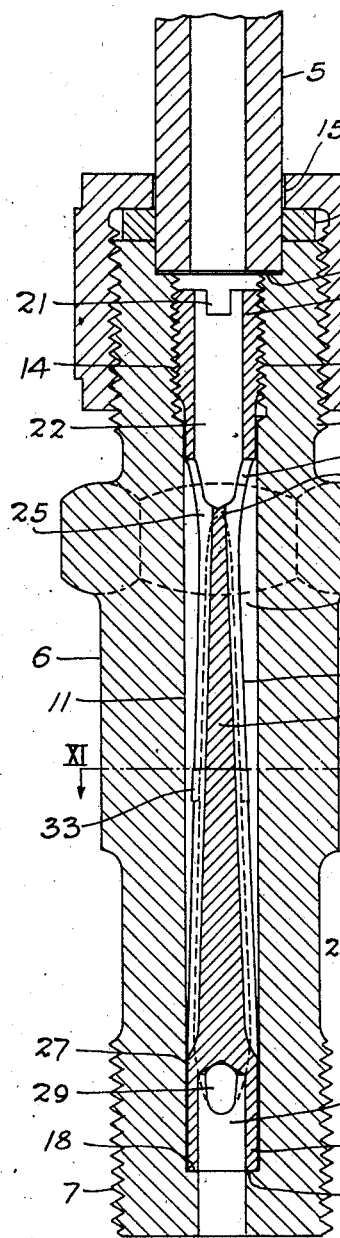
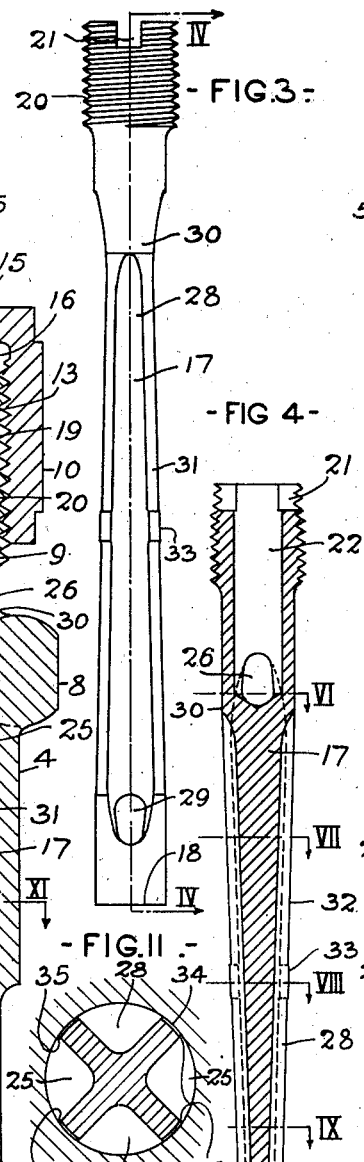
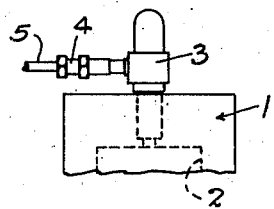
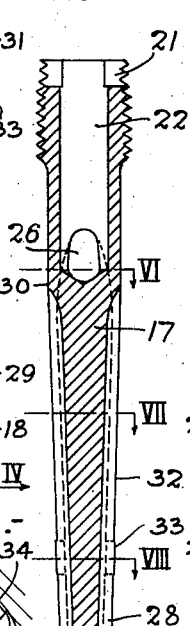
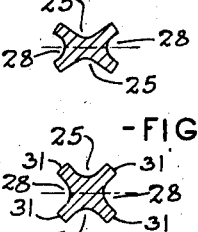
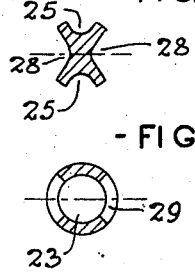
INVENTORS
George K. Aue
William M. Nichols
BY S. C. Yeaton
ATTORNEY Patented Dec. 8, 1942

2,304,492

UNITED STATES PATENT OFFICE 2,304,492

FILTER

George K. Aue and William M. Nichols, Auburn, N. Y., assignors to American Locomotive Company, New York, N. Y., a corporation of New York Application November 9, 1940, Serial No. 365,072

3 Claims. (Cl. 210—164)

This invention relates to filters and more particularly to edge type filters wherein the filtering is attained by passing the liquid to be filtered from a liquid-receiving groove or chamber to a liquid-discharging groove or chamber through a small slit-like passage therebetween and over an edge before entering the passage effective to prevent foreign matter from entering the passage and consequently the discharging groove.

Edge type filters have various applications, but as they are specially adapted for filtering the fuel oil in a Diesel engine, the filter of the present invention is shown applied in the fuel line of a Diesel engine between the fuel pump and one of the fuel injectors.

Fuel oil passing to the fuel injector of a Diesel engine must be free of any solid particles of any substantial size due to the very small size of the injector atomizing orifices, which would be clogged up by any such particles.

It is customary to filter the fuel oil before it passes to the fuel pump of a Diesel engine, and then to give it a final filtering after it has passed through the pump but before it passes through the fuel injectors. There is a filter for each injector, a common form of which being the edge type filter.

Such final filtering, of course, acts to obstruct the fuel passing to the injector, and thereby usually reduces the quantity of fuel available for each injection. In a high power Diesel engine, such for instance as an engine employing an exhaust gas turbine-blower supercharger, it is necessary to have a large quantity of fuel available, especially at high speeds when the injection period is relatively short in length of time.

It is an object of the present invention to devise, in liquid filters of the edge filter type, an improved receiving groove for the liquid to be filtered and an improved discharging groove for the filtered liquid that will effect greater efficiency in the output of the filter.

Other and further objects of and advantages achieved by the present invention will be apparent from the following description of an approved embodiment thereof.

Referring to the drawing forming part of this application, Figure 1 is a diagrammatic view of a portion of a Diesel engine showing the application of the filter embodying the present invention; Fig. 2 is an enlarged central longitudinal section of the filter, including a short section of the fuel line leading thereto, the filter being shown at right angles to its position in Fig. 1, and the filtering element being a section on the line II—II of Fig. 5; Fig. 3 is a side elevation of the filtering element; Fig. 4 is a section on the line IV—IV of Fig. 3; Fig. 5 is a plan view of the filtering element; Figs. 6 to 10 inclusive are sections taken respectively on the lines VI, VII, VIII, IX and X of Fig. 4; and Fig. 11 is an enlarged fragmental section on the line XI—XI of Fig. 2.

Referring to Fig. 1, a portion of a Diesel engine is shown, indicated generally by the reference numeral 1. It includes a cylinder 2, a fuel injector 3 disposed in the top of the cylinder, a horizontally disposed liquid filter 4 connected at one end to the injector at a side thereof, and a fuel line or pipe 5 extending from the other end of the filter to the fuel pump (not shown). It will be understood, as aforesaid, that there is an injector and a filter for each cylinder of the engine.

The filter 4 (Fig. 2) includes a body member 6 having an external thread 7 at one end for securing it to the fuel injector, an external portion 8 for the application of a wrench, an external thread 9 at its other end for receiving an internally threaded cap or nut 10, and a central bore or chamber 11 restricted at its end adjacent the injector to provide a chamber end wall or shoulder 12 and enlarged at its opposite end to provide a shoulder 13. The chamber at its end portion adjacent the shoulder 13 has internal threads 14 extending a substantial distance into the chamber for a purpose later to be described.

The nut 10 has a central orifice 15, in line with the chamber 11, through which extends the pipe 5, the end of the pipe fitting in the adjacent enlarged end of the chamber in slightly spaced relation to the shoulder 13. An outwardly extending circumferential flange 16 is secured to the outer surface of the pipe 5, as by welding (not shown). This flange is engaged at one side by the adjacent end of the body member and at the other side by the adjacent inner end face of the nut, the engagement being fluid-tight when the nut is tightened up to prevent escape of fuel oil from the chamber.

A filtering member or element 17 is disposed in chamber 11, with its end 18 adjacent the shoulder 12 in engagement therewith. The opposite end portion 19 of the filtering element has external threads 20 in engagement with the threads 14, and a slot 21 for the application of a screw driver for turning the filtering element. The filtering element is turned until, because of its threaded engagement with the body member, its end 18 firmly engages the shoulder 12.

Thus the filtering element is directly secured to the body member.

As the threaded portions 14 and 20 are relatively long, this threaded connection affords ample strength to resist any thrusts which the filtering element may be subjected to because of the injection impulses. This connection is not affected by either the connection of the filter with the injector or of nut 10 with the filter body member 6. Moreover, if vibrations or other forces should cause the filtering element to rotate in the chamber 11 so that the engagement between the end 18 and the shoulder 12 became broken, the filtering element would still be held against injurious longitudinal movement in the chamber by its threaded connection.

The filtering element can not become accidentally unthreaded from the body member because during the permitted amount of longitudinal movement of the filtering element it will remain in threaded engagement with the body member. Therefore, in the present construction, it is impossible for thrusts imparted to the filtering element by the injection impulses to move the filtering element longitudinally so as to hammer the end 18. This is an important advantage of the instant filter, for the small end 18 (greatly enlarged in Fig. 2) is formed as a relatively slender annular ring and it seats against a relatively slender shoulder, both of which would soon be damaged if any hammering were permitted.

The filtering element further includes a relatively short axial bore 22 in its end portion 19 providing a fuel inlet chamber, and a short axial bore 23 in its end portion 24 adjacent the injector, providing a fuel discharge or outlet chamber. Two fuel receiving grooves 25, formed in the defining longitudinal side face of the filtering element, on diametrically opposite sides thereof, extend longitudinally of the filtering element, from the inlet chamber 22, to which each is connected by a port or opening 26, substantially to the outlet chamber 23, the ends of the grooves 25 adjacent the outlet chamber being closed therefrom by a solid portion 27. Each groove 25 as shown is relatively wide and relatively deep near the opening 26 and decreases in width and depth as it approaches the outlet chamber, as is shown by the successive cross sections of Figs. 7, 8 and 9. Briefly, these grooves taper in width and depth from their inlet ends to their opposite ends.

Two fuel discharging grooves 28, formed in the defining longitudinal side face of the filtering element, between the receiving grooves 25 and disposed on diametrically opposite sides of the filtering element, extend longitudinally of the filtering element from the outlet chamber, to which each is connected by a port or opening 29, substantially to the inlet chamber, the ends of the grooves 28 adjacent the inlet chamber being closed therefrom by a solid portion 30. The grooves 28 are similar in shape to the grooves 25 but oppositely disposed, that is to say, the large ends of the grooves 28 are disposed near the openings 29 and adjacent the small ends of the grooves 25 and the small ends of the grooves 28 are disposed at the inlet chamber end adjacent the large ends of the grooves 25. Thus the filtering element has alternate receiving and discharging grooves spaced circumferentially at equal distances from each other by intervening walls 31 which are of equal thickness.

The diameter of the filtering element, at the end portion 24 and at the unthreaded part of the end portion 19, is substantially the same as that of the chamber 11 so that when the filtering element is disposed in the chamber 11 it is held centrally therein by the accurate fit between its end portions and the defining face of the chamber 11. The threaded engagement between threads 14 and 20 also assists in centralizing the filtering element. The diameter of the defining face of the remainder or intermediate portion 32 of the filtering element, which defining face is of the face of the walls 31, is slightly less than the diameter of the chamber 11 except at the central portion of the intermediate portion 32 where the diameter is increased to form a segmental collar 33, the diameter of the collar being substantially the same as the diameter of chamber 11, thereby centrally locating the filtering element in the chamber at the central portion. The collar 33 is formed by four lugs or enlargements formed one on each of the walls 31.

The filtering element, throughout its intermediate portion having a smaller diameter than the diameter of the chamber 11, is spaced from the defining face of the chamber 11 a small amount to provide the filtering spaces 34, of slit-like formation, across which the fuel oil flows from the receiving grooves to the discharging grooves. These spaces only are present between the opposed defining faces of the walls 31 and chamber 11. The defining faces of the walls 31 opposed to the defining face of the chamber 11 provide the edges 35 over which the fuel oil is filtered. That is to say, the fuel oil, in passing from the receiving grooves to the discharging grooves, must pass over the edges 35 which are the edges of the walls 31 on the receiving groove sides of the walls 31, and then through the spaces 34. Thus the fuel oil, in crossing the edges 35, is strained of any solid particles of any material size which may still be present.

The tapered longitudinal grooves, as aforedescribed, of the present invention, other entering factors being equal, permit a greater passage of fuel therethrough than do straight longitudinal grooves usually employed over which the present invention is an improvement. Thus greater efficiency is obtained. The reason for this is that the receiving grooves gradually decrease and the discharging grooves gradually increase in cross-sectional area from the inlet end to the outlet end of the filter (i. e., in the direction of flow) so that a larger effective inlet and a larger effective outlet is possible than in the case of the straight grooves.

Furthermore the flow in all of the grooves is in the same direction, namely from the filter inlet end to its outlet end and its cross-sectional area (combined cross-sectional areas of the receiving and discharging grooves) in all transverse planes is uniform. Therefore there is no restriction to the flow of the fuel, so that, by proper proportioning, fuel at full inlet capacity continuously enters the filter.

Viewing the operation from a somewhat different angle, the fuel entering a receiving groove must be in amount sufficient to fill this groove throughout its entire length while at the same time fuel is filtering therefrom to a discharging groove. This fuel, upon entering the receiving groove, begins its filtering over, and consequently decreases in volume so that it is conveniently accommodated by the gradually decreasing cross-sectional area of the receiving groove. This in effect produces a continual unimpeded flow through the receiving groove. In short, at any point in its flow, the fuel is in right amount for the next point in its flow after it has filtered the required amount over.

The reversely tapered discharging groove works in accord with the receiving groove. It takes the fuel filtering over adjacent the inlet port of the filter. This fuel is of small cross-sectional area and is accommodated by the small cross-sectional area of the discharging groove at this point. This filtered fuel then moves to the next point of the discharging groove which is of larger cross-sectional area and has added to it the fuel filtered over at this point. Thus this point in the discharging groove is filled.

The fuel thus progresses through the discharging groove, always increasing in cross-sectional area at successive points due to the fuel filtered over at these successive points and always being accommodated as it increases in cross-sectional area by the increase in cross-sectional area of the discharging groove. This manner of flow continues on until the fuel in the discharging groove reaches the outlet port.

Thus there is a continual unimpeded flow of fuel from an inlet port to an outlet port. This makes it possible to provide maximum inlets for the receiving grooves at the inlet end of the filter because the discharging grooves at this end are relatively small in cross-sectional area and likewise maximum outlets for the discharging grooves are provided at the outlet end of the filter because the receiving grooves at this end are relatively small in cross-sectional area, and fuel at full inlet capacity continuously enters the filter, and is discharged at the outlet.

The above remarks have been made as if a receiving groove filtered over into only one discharging groove, but in the preferred embodiment shown each receiving groove filters over into two discharging grooves. However, the basic principle of operation is the same.

Figs. 8 and 11 show cross sections respectively at the lines VIII, Fig. 4, and XI—XI, Fig. 2, which are in the neighborhood of the center of the grooves. The four grooves are shown in cross section and are substantially equal. Groove sections above and below the central section and equally distant therefrom each include groove sections the areas of which when added together equal the areas of the four groove sections shown in Fig. 8. Figs. 7 and 9 show two such sections, but instead of the receiving and discharging groves being equal as in Fig. 8, they are unequal, the receiving grooves of Fig. 7 being equal to the discharging grooves of Fig. 9 and the discharging grooves of Fig. 7 being equal to the receiving groves of Fig. 9. This is of course due to the reverse direction of tapering of the otherwise similar grooves.

While only four grooves have been shown, it will be understood that a different number may be employed if desired. By placing a discharging groove between two receiving grooves and a receiving groove between two discharging grooves as in the present instance, each receiving groove supplies two discharging grooves and each discharging groove is supplied by two receiving grooves. Thus the four edges 35 are continually operating as filtering edges, two edges serving to filter the liquid from each receiving groove.

The tapering grooves of the present invention have been shown formed in the filtering element which is disposed in the chamber 11 of the body member 6. However, it will be understood that the invention lies, as far as the tapered grooves are concerned, in the tapered grooves themselves, and these grooves may be employed in filters of various types. Thus, for instance, the grooves may be made in the face of the chamber 11, or the receiving grooves may be made in the filtering element whereas the discharging grooves may be made in the face of the chamber 11. Various other combinations may also be employed. Moreover, the grooves have application to filtering elements, such as the element employed in the patent to Schlaupitz, No. 2,067,131, January 5, 1937, wherein the filtering element is disposed around the fuel injector within the injector casing.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A liquid fuel filter for a supply pipe for a fuel nozzle of an internal combustion engine comprising an outer member providing a fitting for said pipe and having a longitudinally extending bore-like chamber; and an inner slender elongated member housed in said chamber, the face of said chamber and the opposed face of said inner member being substantially spaced at intervals about the axis of said chamber providing longitudinally extending similar passageways, said passageways being alternately unrestrictedly open at the opposite ends and closed at the other ends, said open ends being alternately for admission of said liquid to and for emission of said liquid from said fitting, the portions of said faces between adjacent passageways being slightly spaced permitting passage of liquid from the adjacent passageway having an admission open end to the adjacent passageway having an emission open end and serving as an edge filter for said passing liquid, each of said passageways having three defining walls providing three corners diverging from each other from said closed to said open end of said passageway providing uniformly increasing cross-sectional areas from its said closed to its said open end, two of said corners being open each to the space between the adjacent slightly spaced portions.

2. A liquid fuel filter for a supply pipe for a fuel nozzle of an internal combustion engine comprising an outer member providing a fitting for said pipe and having a longitudinally extending bore-like chamber; and an inner slender elongated member housed in said chamber, the face of said chamber and the opposed face of said inner member being substantially spaced at intervals about the axis of said chamber providing longitudinally extending similar passageways, said passageways being alternately unrestrictedly open at the opposite ends and closed at the other ends, said open ends being alternately for admission of said liquid to and for emission of said liquid from said fitting, the portions of said faces between adjacent passageways being slightly spaced permitting passage of liquid from the adjacent passageway having an admission open end to the adjacent passageway having an emission open end and serving as an edge filter for said passing liquid, each of said passageways having three defining walls providing three corners diverging from each other from said closed to said open end of said passageway providing uniformly increasing cross-sectional areas from its said closed to its said open end, one of said corners being closed and inclined to and in a plane with said axis and the other two corners being inclined to said plane whereby said passageway increases both in width and depth uniformly from its said closed to its said open end, said other two corners being open each to the space between the adjacent slightly spaced portions.

3. A liquid fuel filter for a supply pipe for a fuel nozzle of an internal combustion engine comprising an outer member providing a fitting for said pipe and having a longitudinally extending bore-like chamber; and an inner slender elongated member housed in said chamber, the face of said elongated member being provided with grooves, V-shaped in cross section, spaced at intervals about the axis of said chamber providing with opposed face portions of said chamber longitudinally extending similar passageways, said passageways being alternately unrestrictedly open at the opposite ends and closed at the other ends, said open ends being alternately for admission of said liquid to and for emission of said liquid from said fitting, the portions of said faces between adjacent passageways being slightly spaced permitting passage of liquid from the adjacent passageway having an admission open end to the adjacent passageway having an emission open end and serving as an edge filter for said passing liquid, each of said passageways having three defining walls providing three corners diverging from each other from said closed to said open end of said passageway providing uniformly increasing cross-sectional areas from its said closed to its said open end, one of said corners being closed and provided by the meeting of the inner edges of the walls of the correlated groove and the other two corners being provided each by an outer edge of one of said correlated groove walls and the opposed face portion of said chamber, and being open each to the space between the adjacent slightly spaced portions, said closed corner being inclined to and in a plane with said axis and the other two corners being inclined to said plane whereby said passageway increases both in width and depth uniformly from its said closed to its said open end.

GEORGE K. AUE.
WILLIAM M. NICHOLS.